United States Patent [19]

Guglielmo, Sr.

[11] 4,046,587

[45] Sept. 6, 1977

[54] PRIMER COMPOSITION, PROCESS FOR USING SAME AND PRODUCT OBTAINED THEREBY

[76] Inventor: Richard J. Guglielmo, Sr., Lambs Lane, Cresskill, N.J. 07626

[21] Appl. No.: 643,699

[22] Filed: Dec. 23, 1975

[51] Int. Cl.² .......................... C08K 5/02; C08L 9/06; C09D 3/393
[52] U.S. Cl. .......................... 106/271; 260/28.5 AV; 260/33.8 UA; 427/407 E; 428/315
[58] Field of Search .............. 260/28.5 AV, 33.8 UA; 106/271

[56] References Cited

U.S. PATENT DOCUMENTS

| | | | |
|---|---|---|---|
| 2,564,199 | 8/1951 | Feldman | 106/271 |
| 2,698,262 | 12/1954 | Balmas | 106/271 |
| 3,896,067 | 7/1975 | Kosaka et al. | 260/28.5 AV |
| 3,940,355 | 2/1976 | Engelbrecht et al. | 260/28.5 AV |

Primary Examiner—Donald E. Czaja
Assistant Examiner—H. H. Fletcher
Attorney, Agent, or Firm—Marn & Jangarathis

[57] ABSTRACT

There is disclosed a primer composition which is coated on the polyolefinic-containing foam prior to application of the vinyl film and is comprised of a chlorinated hydrocarbon solvent in which there are added a material selected from the group consisting of a chlorinated paraffin, an acrylic type ester, and a vinyl copolymer.

5 Claims, No Drawings

PRIMER COMPOSITION, PROCESS FOR USING SAME AND PRODUCT OBTAINED THEREBY

This invention relates to a composition of matter and a process for using same, and more particularly to a primer material for laminating or applying a vinyl film to a polyolefinic foam, process for using same and products obtained therefrom.

BACKGROUND OF THE INVENTION

In order to produce an acceptable impact absorbing article, for example, a gym mat, a foam material must have the proper shock absorbing and safety features and be soft enough to permit the mat to be rolled for shipping and storage purposes. Presently, polyvinyl chloride foams have been provided with a flexible vinyl protective finish of from 10 - 25 mils. thick.

A polyethylene crosslinked closed cell flexible foam meets the basic requirements for an impact absorbing material and offers a number of important advantages (in addition to cost considerations) over PVC closed cell foam, e.g., less shrinkage after coating (1% vs. - 15% for PVC foam), lighter in weight (approximately 30% less), low temperature flexibility, ease of heat sealing for bonding purposes. It will be appreciated that while either foam without such a protective film met the requirements of a gym mat, that such a foam is rather weak and will be readily destroyed in such use.

To date, the major drawback to the use on Gym Mat applications of a polyolefinic-containing foam has been the inability to obtain adhesion of a protective vinyl film to the polyolefinic foam so that the weakest point of the composite upon destruction is foam failure. In U.S. Pat. No. 3,816,234 to Winfield there is disclosed an energy absorbing laminate comprised of a plurality of layers requiring many processing steps.

OBJECTS OF THE INVENTION

It is an object of the present invention to provide a novel composition of matter to effect the lamination and/or bonding between a vinyl protective film and a polyolefinic-containing foam.

Another object of the present invention is to provide a novel process for laminating and/or applying in a facile way a vinyl film to a polyolefinic-containing foam.

SUMMARY OF THE INVENTION

These and other objects of the present invention are achieved in a preferred embodiment of the invention by an essentially primer composition which is coated on the polyolefinic-containing foam prior to application of the vinyl film and is comprised of a chlorinated hydrocarbon solvent in which there are added a material selected from the group consisting of a chlorinated paraffin, an acrylic type ester, and a vinyl copolymer.

DETAILED DESCRIPTION OF THE INVENTION

A further object of the present invention will be had from the following detailed description thereof. The primer system of the present invention meets the following requirements:
1. Simple application, e.g. spraying.
2. Dries at room temperature within a short period of time to permit handling for the application of the vinyl coating.
3. Effects excellent adhesion to permit handling of the composite within a couple of hours and to permit rolling of the composite within 12 hours.
4. The composite to withstand temperatures up to 170° F. for long periods of time during storage and shipping without failure.

The amount of solids in the solvent is in the range of from 2 to 10%, preferably 5%. Generally, to obtain exceedingly excellent results, the foam surface is first treated with the primer and the vinyl coating in solution is applied by spraying (hot or cold) or by painting (roller or brush) at a temperature generally of from 50° to about 140° F. At temperatures in excess of about 140° F., the foam has a tendency to distort. Pre-cleaning and washing with a solvent, such as 1, 1, 1-trichloroethane, is generally recommended to remove from the surface dirt, grease, releasing agents and the like. The solvent is believed to act as a wetting agent for the foam and opens up and softens the foam cells to permit penetration of the solids of the primer into the cells with adhesion being effected by cohesive bonding of the solids between the foam cells and viny coating. It is believed that adhesion is not effected to any great extent by copolymerization. Nevertheless, a vinyl coated energy absorbing foam product is produced whereby delamination is effected by foam failure rather than film failure when subjected to destruction tests.

The closed-cell polyolefinic-containing foams which are treated in accordance with the present invention are the foams prepared from resins including polyethylene monomers, polypropylene monomers, polyethylene copolymers, polypropylene copolymers, and mixtures thereof and as well as other resin additives.

The materials added to the solvent for a preferred embodiment of the present invention, i.e. universal primer, is comprised of a chlorinated paraffin, a thermoplastic acrylic type ester and a vinyl copolymer. A chlorinated paraffin is generally a liquid and resinous product derived by carefully controlled chlorination of paraffin waxes and liquids to a chlorination level of from 40 to 80%. Examples of such chlorinated paraffins are those sold under the trademark "CHLOROWAX" together with a number designation, e.g. 70, to indicate degree of chlorination. A thermoplastic acrylic type ester includes those sold by Rohm and Haas under the trademark "Acryloid" together with a letter and number designation, e.g. A-10, A-11, A-101, A-21, A-21LV, A-30, B-44, B-48N, B-50, B-66, B-67, B-67 MT, B-72, B-82, B-99, C-10LV, F-10 and NAD-10. Such acrylic type resins are also sold by duPont and Union Carbide under different trademarks. A vinyl copolymer includes those sold by E. I. duPont de Nemours and Company under the trade designation "ELVAX" together with a number designation, e.g. 40, 150, 210, 220 240, 250, 260, 265, 310, 350, 360, 410, 420, etc. These Elvax resins are copolymers of ethylene and vinyl acetate according to Engelbrecht, U.S. Pat. No. 3,940,355, column 4.

A chlorinated hydrocarbon solvent includes those listed in the Raw Materials Index Solvent Section of the "National Paint and Coating Association" on Pages 47 and 48 designated Sct. No. 1 April 1973 from a publication dated October 1972 constituting a superceding publication dated June 1968 and include, for example, ethylene dichloride, trichloroethylene, trichloroethylene propylene dichloride, monochlorobenzene, 1,2,4-trichlorobenzene and the like. 1,1,1-trichloroethane has been found to be particularly useful since it may be readily handled with standard ventilation requirements.

Some of the other chlorinated solvents are quite toxic requiring special handling procedures.

As hereinabove discussed, in a particularly preferred embodiment of the invention with reference to a universal primer, all of the above mentioned resins are proportionally admixed with the chlorinated solvent. It will be understood that for various applications, for instance, where the foam material is to be prepared in a plant using only one source of polyolefinic resin for manufacturing the foam, that one or possibly two of the aformentioned materials may be omitted. However, if the foam material in a plant is to be varied, the preferred primer is desirable and includes all of such materials. Additionally, it will be appreciated that two primers may be prepared with successive application of such primers, e.g. one primer found by admixing one or two resins in a chlorinated solvent, and a second primer formed by admixing the remaining resin or resins in a compatible chlorinated solvent with the foam material being successively coated with such primers.

EXAMPLES OF THE INVENTION

The following examples are illustrative of the present invention.

EXAMPLE I

A polyethylene foam was coated by spraying a primer comprised of the following components:

| Ingredient | % by weight |
|---|---|
| 1,1, 1 trichloroethane | 90 |
| Cyclohexanone Resin | 8 |
| PVC Copolymer Resin | 2 |
| | 100 |

After 10 minutes, the foam is dry enough to permit application of the vinyl coating which is effected by painting a solution formulation of polyvinyl coating. After 24 hours, the foam is rolled and packed for shipping in the usual manner.

EXAMPLE II

The operational steps of Example I are followed, except a primer comprised of the following component is used:

| Ingredient | % by weight |
|---|---|
| 1,1,1-trichloroethane | 90 |
| PVC Copolymer Resin | 6 |
| Chlorowax No. 70 | 4 |
| | 100 |

EXAMPLE III

A primer having unlimited or universal application is comprised of the following components:

| Ingredient | % by weight |
|---|---|
| 1,1,1-trichloroethane | 97.375 |
| Chlorowax No. 70 | .875 |
| Acryloid B-66 | .875 |
| Elvax 150 | .875 |
| | 100.000 |

While the present invention has been described with reference to gym mats, it will be appreciated that other uses may be made of such a vinyl coated polyethylene film, e.g. wall panels and the like.

What is claimed is:
1. A primer composition for treating a polyolefinic-containing foam material to permit effective adhesion of a polyvinyl coating thereon which comprises:
   a chlorinated hydrocarbon solvent in which there is admixed a resin material selected from the group consisting of a chlorinated paraffin wax, an acrylic type ester polymer and a vinyl copolymer, and mixtures thereof, said material constituting of from 2 to 10 percent by weight of said primer composition.
2. The primer composition as defined in claim 1 including two of said materials.
3. The primer composition as defined in claim 1 including all three of said materials.
4. The primer composition as defined in claim 1 wherein said materials constitute about 5 percent by weight of said primer composition.
5. The primer composition as defined in claim 4 wherein said solvent is 1,1,1-trichloroethane.

* * * * *